US011392882B2

(12) United States Patent
Thompson et al.

(10) Patent No.: US 11,392,882 B2
(45) Date of Patent: Jul. 19, 2022

(54) SYSTEMS AND METHODS FOR MANAGING INFORMATION ASSOCIATED WITH STORAGE CONTAINERS

(71) Applicant: Wide Afternoon, LLC, Chicago, IL (US)

(72) Inventors: Ty Thompson, Chicago, IL (US); David Joseph, Chicago, IL (US)

(73) Assignee: Wide Afternoon, LLC, Chicago, IL (US)

( * ) Notice: Subject to any disclaimer, the term of this patent is extended or adjusted under 35 U.S.C. 154(b) by 867 days.

(21) Appl. No.: 14/952,386

(22) Filed: Nov. 25, 2015

(65) Prior Publication Data

US 2016/0162832 A1 Jun. 9, 2016

Related U.S. Application Data

(60) Provisional application No. 62/087,482, filed on Dec. 4, 2014.

(51) Int. Cl.
*G06Q 10/08* (2012.01)

(52) U.S. Cl.
CPC ..... *G06Q 10/0832* (2013.01); *G06Q 10/0833* (2013.01)

(58) Field of Classification Search
CPC ............... G06Q 10/0832; G06Q 10/0833
See application file for complete search history.

(56) References Cited

U.S. PATENT DOCUMENTS

| 2004/0160196 | A1* | 8/2004 | Wong | H05B 33/0803 315/291 |
| 2005/0105395 | A1* | 5/2005 | Harrison | G04F 1/005 368/10 |
| 2007/0195074 | A1* | 8/2007 | Gelissen | G09G 3/3406 345/204 |
| 2012/0274470 | A1* | 11/2012 | Sandvick | G08B 5/36 340/584 |

(Continued)

OTHER PUBLICATIONS

P. H. Chou et al., "A Bluetooth-Smart Insulating Container for Cold-Chain Logistics," 2013 IEEE 6th International Conference on Service-Oriented Computing and Applications, 2013, pp. 298-303, doi: 10.1109/SOCA.2013.46. (Year: 2013).*

*Primary Examiner* — Emmett K. Walsh
(74) *Attorney, Agent, or Firm* — Patent Technologies, LLC; Robert D. Gunderman, Jr.

(57) ABSTRACT

Systems and methods are disclosed for managing information associated with storage containers. In accordance with some embodiments, a wireless tracking module includes a communications interface, a timer, and an indicator. The communications interface may receive instructions to track spoilage status of a perishable stored in a storage container and the timer may track a time duration associated with spoilage status of the perishable based on the received instructions. An indication may be provided by the indicator that reflects the spoilage status based on the time remaining in the tracked time duration. Further disclosed embodiments include a storage container including a wireless tracking module. Other embodiments disclose a tracking device that communicates with the wireless tracking module and includes a timer controller, a communications interface, and an alarm.

18 Claims, 5 Drawing Sheets

(56) References Cited

U.S. PATENT DOCUMENTS

2012/0293332 A1\* 11/2012 Rosenfeld ........... A47J 41/0027
340/584
2016/0034758 A1\* 2/2016 Kozicki .................... G06T 7/12
382/190

\* cited by examiner

SYSTEMS AND METHODS FOR MANAGING INFORMATION ASSOCIATED WITH STORAGE CONTAINERS

CROSS-REFERENCE TO RELATED APPLICATIONS

This application claims the benefit of U.S. Provisional Patent Application No. 62/087,482, filed Dec. 4, 2015, entitled "SYSTEMS AND METHODS FOR MANAGING INFORMATION ASSOCIATED WITH STORAGE CONTAINERS," which is incorporated by reference herein in its entirety.

BACKGROUND

The present disclosure generally relates to storage containers used for storing and preserving food and other perishables. Specifically, the present disclosure relates to systems and methods for sensing and managing information associated with storage containers.

Storage containers may be used to preserve food and other perishables, sort and organize food supplies, and delay the onset of spoilage. Food can be partitioned into multiple storage containers for the convenience of the user, such as a consumer or a commercial entity, including a restaurant, food producer, wholesaler, or distributor. For example, a user may purchase food in single-serve containers so that the entire contents can be consumed in one sitting. As another example, a user may use storage containers to store and preserve food that is left over from one or more meals. In still another example, commercial food producers can store, organize, and track food shipments and supplies. Further, storage containers can be used in conjunction with refrigeration to increase the effectiveness of spoilage prevention.

Current systems and methods of storage, however, do not provide a user with the ability to track the spoilage status of food or perishable contents in a storage container. Moreover, current systems and methods of storage do not provide a user with any indication of whether food or perishable contents in a storage container are still safe to consume or have spoiled and should be discarded. Further still, current systems and methods of storage do not provide a user with a wireless system for maintaining and tracking a database of storage containers without actually checking the contents, visually or otherwise.

The present disclosure addresses these shortcomings by providing a means to store, track, and coordinate food or perishable supplies, relay spoliation data in real time, eliminate the need for visual and other types of inspection, and generally improve food safety and preservation efforts.

SUMMARY

The present disclosure relates to embodiments for tracking food contents stored in storage containers. Moreover, embodiments of the present disclosure include systems, methods, and computer-readable media managing information associated with food storage containers. As will be appreciated, embodiments of the present disclosure may be implemented with any combination of hardware, software, and/or firmware, including computerized systems and methods embodied with processors or processing components.

In one disclosed embodiment, a system for managing information associated with a storage container includes a storage container and a wireless tracking module included in the container. The wireless tracking module includes a communications interface, a timer, and an indicator. The communications interface may receive instructions to track spoilage status of a perishable stored in the storage container and the timer may track a time duration associated with spoilage status of the perishable based on the received instructions. An end time of the time duration may correspond to a time at which the perishable is expected to be spoiled. The indicator may provide an indication of the spoilage status based on the time remaining in the tracked time duration.

In another disclosed embodiment, a wireless tracking module for managing information associated with a storage container includes a communications interface, a timer, and an indicator. The communications interface may receive instructions to track spoilage status of a perishable stored in a storage container, the storage container being associated with the wireless tracking module. The timer may track a time duration associated with spoilage status of the perishable based on the received instructions. An end time of the time duration may correspond to a time at which the perishable is expected to be spoiled. The indicator may provide an indication of the spoilage status based on the time remaining in the tracked time duration.

In still another disclosed embodiment, a tracking device for managing information associated with a storage container includes a timer controller, a communications interface, and an alarm. The timer controller may receive input corresponding to selection of a time duration for tracking spoilage status of a perishable stored in a storage container, the storage container being associated with a wireless tracking module. The communications interface may provide instructions to the wireless tracking module to track the spoilage status of the perishable based on the time duration. An end time of the time duration may correspond to a time at which the perishable is expected to be spoiled. The alarm may provide an indication of the spoilage status of the perishable based on time remaining in the time duration tracked by the wireless tracking module.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate the disclosed embodiments and, together with the description, serve to explain the principles of the disclosed embodiments.

DETAILED DESCRIPTION

Embodiments of the present disclosure provide improved systems and methods for managing information associated with storage containers. The disclosed embodiments provide real-time monitoring of events and aspects associated with contents stored in one or more storage containers. According to the embodiments, a tracking module may include one or more sensors and/or a timer capable of sensing and collecting data and events associated with storage container contents, as well as aspects of the surrounding environment. The tracking module can track, for example, spoilage status of food or perishable contents with minimal user input. The tracking module may also include one or more indicators that provide easy identification of spoilage status to the user.

The disclosed embodiments also provide a tracking device that conveniently maintains a database of tracked containers and the statuses associated with their contents. The tracking module may transmit the sensed and collected data to the tracking device for display to the user. Users are able to use the tracking device to customize aspects of the tracking module and transmit commands to the tracking module over a wired or wireless network. The commands may provide an indication to the user of a specific container and the spoilage status associated with contents stored in the container.

Accordingly, the improved systems and methods disclosed herein provide users with the ability to automate and streamline tracking of inventory including food, perishable items, and/or ingredients used at home or in a business. For example, the improved systems and methods disclosed herein may improve operating efficiency by providing real-time indications of spoilage status, thereby alerting a business that inventory should be used immediately or discarded and restocked. Moreover, the improved systems and methods disclosed herein may minimize a consumer's costs associated with discarding uneaten food by providing indications that food is about to spoil and should be consumed immediately. The improved systems and methods disclosed herein also may improve a consumer's management of grocery shopping lists by providing indications that food, perishable items, and/or ingredients have spoiled and therefore need to be repurchased. Furthermore, the improved systems and methods disclosed herein may improve food safety by indicating to businesses and consumers that food or perishable items may have spoiled and therefore are not safe for consumption.

Reference will now be made in detail to exemplary embodiments, examples of which are illustrated in the accompanying drawings. Wherever possible, the same reference numbers will be used throughout the drawings to refer to the same or like parts.

Figure 1:
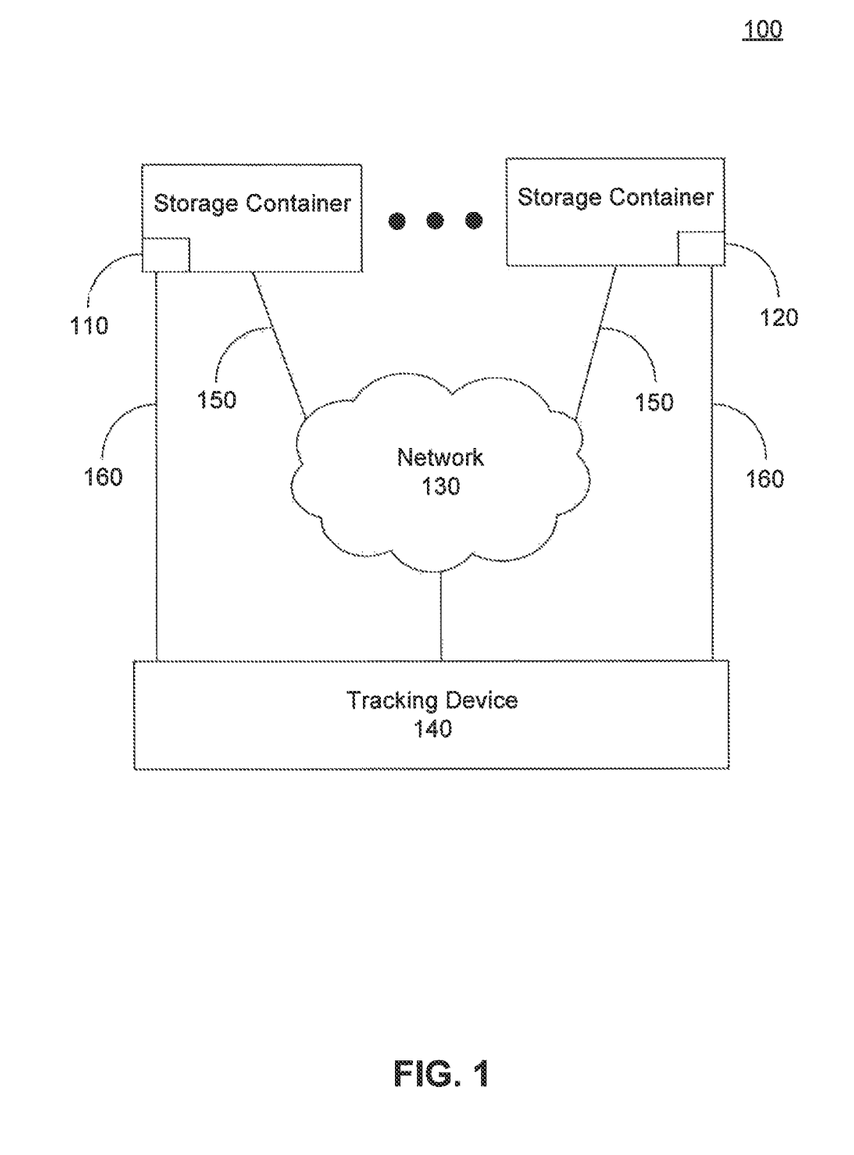
FIG. 1 illustrates an example system for implementing some embodiments and aspects of the present disclosure.

FIG. 1 illustrates a system 100 for managing information associated with storage containers. System 100 may include tracking modules 110 and 120, a tracking device 140, and a network 130. System 100 is an example. The number and distribution of the various entities shown in system 100 may be different depending on specific embodiments. For example, the components in system 100 may be combined and/or distributed over multiple entities, including other computers, handheld computers, mobile phones, tablet computers, or other computing platforms. Thus, the configuration described in system 100 is exemplary only and is not intended to be limiting.

Tracking modules 110 and 120 may be associated with one or more storage containers that contain food contents, including, for example, prepackaged food or food left over from one or more meals. According to some embodiments, food producers, wholesalers, distributors, and/or restaurants may prepackage food contents into one or more storage containers for sale to consumers. For example, food producers may prepackage food contents into one or more storage containers in bulk portions, i.e., a large amount of a single type of food content. Coffee beans, herbs and spices, pre-sliced deli meats ("lunch meat"), nuts, or grains are examples of food contents that may be prepackaged in storage containers in bulk portions. Alternatively, food producers may prepackage food contents into one or more storage containers in single-serve portions, i.e., a portion of food contents generally intended to be consumed by a consumer in one sitting. Yogurt, pre-made sandwiches, and soups are examples of food contents that may be prepackaged in storage containers in single-serve portions.

In some embodiments, users (e.g., food producers, wholesalers, distributors, restaurants, consumers, etc.) may store food contents into one or more storage containers for later consumption. For example, a user may purchase food contents prepackaged in one or more storage containers in bulk portions. The user may partition the bulk food contents into one or more smaller portions and store the smaller portions in one or more storage containers. As another example, a user may prepare a meal that is not fully consumed in one sitting. The user may divide the left over meal into portions and store the portions into one or more storage containers for later consumption.

A user may use tracking device 140 to track various aspects of food contents stored in the storage containers. For example, tracking device 140 may be used to track the type of food contents stored in one or more storage containers located in a refrigeration unit. As another example, tracking device 140 may be used to track the spoilage status of the food contents stored in one or more storage containers. Tracking device 140 may include smartphones, tablets, notebooks, electronic readers, personal digital assistants, personal computers, laptop computers, desktop computers, large display devices, and/or other types of handheld, electronics, or communication devices. Tracking device 140 may also include appliances such as kitchen appliances. For example, tracking device 140 may be a "smart" kitchen appliance such as a refrigeration unit, a freezer unit, or a combination refrigeration/freezer unit. In some embodiments, tracking device 140 may be implemented with hardware devices and/or software applications running thereon.

In some embodiments, tracking device 140 may be configured to communicate through wired or wireless connections 150 to and/or through network 130 with one or more tracking modules such as tracking module 110 and 120 and vice-versa. Network 130 may include any combination of communications networks. For example, network 130 may include the Internet and/or any type of wide area network, an intranet, a metropolitan area network, a local area network (LAN), a wireless network, a cellular communications network, etc. In some embodiments, tracking device 140 may be configured to transmit requests (e.g., requests based on input provided by one or more users) or other data through network 130 to an appropriate tracking module. Tracking device 140 may also be configured to receive information from tracking module 110 and/or 120 through network 130, including data or content sent in response to such requests.

In some embodiments, tracking device 140 may be configured to communicate with one or more tracking modules through one or more peer-to-peer connections 160. Peer-to-peer connections 160 may be implemented using any suitable combination of peer-to-peer communication technologies. For example, peer-to-peer connection 160 may utilize near-field communication (NFC), Wi-Fi Direct, Bluetooth, and/or any other form of peer-to-peer connection. In some embodiments, peer-to-peer connection 160 may comprise a wireless connection. In other embodiments, peer-to-peer connection 160 may include a wired connection.

In some embodiments, tracking modules 110, 120 may sense and manage information associated with one or more storage containers.

Figure 2:
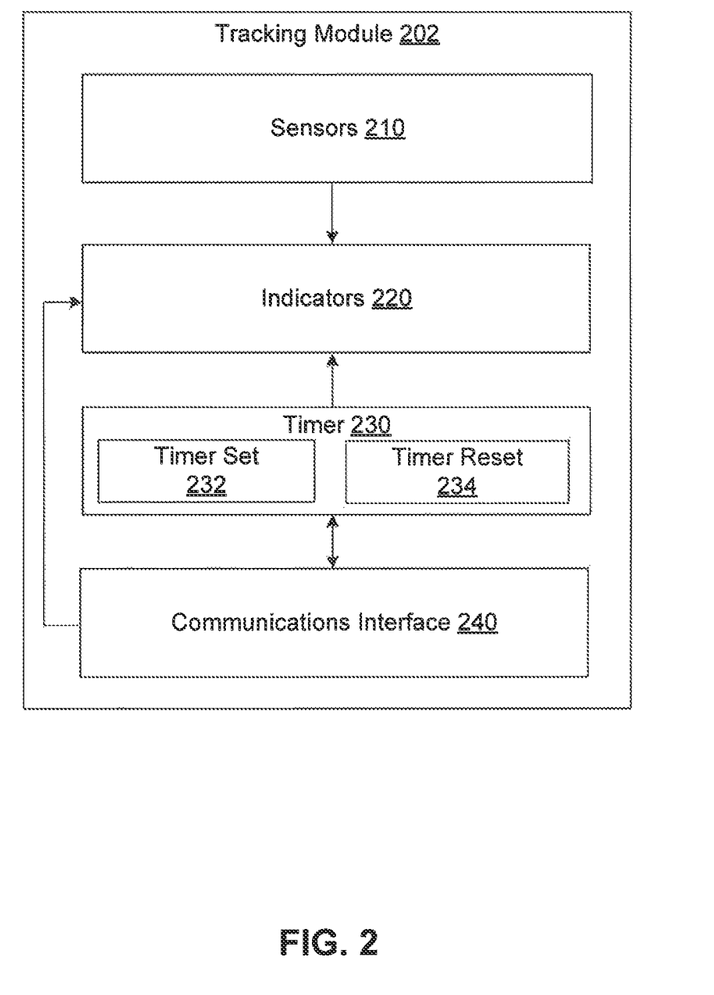
FIG. 2 illustrates an tracking module for implementing some embodiments and aspects of the present disclosure.

FIG. 2 illustrates an example tracking module 202 for sensing and managing information associated with one or more storage containers. By way of example, tracking module 202 may be used to implement tracking module 110 and/or 120 of FIG. 1. In some embodiments, tracking module 202 may be a standalone device that is capable of being temporarily or permanently affixed to a structure. For example, tracking module 202 may be capable of being temporarily affixed to a lid or a body of a storage container using a clip, adhesive strip, or magnet. In other examples, tracking module 202 may be affixed, to any other structures such as kitchen appliance (e.g., magnetically affixed to a refrigerator door), countertops, or storage racks. In some embodiments, tracking module 202 may be included in a structure. For example, tracking module 202 may be included in a lid or body of a storage container, a kitchen appliance (e.g., integrated into a refrigerator door), a storage rack, etc.

Tracking module 202 may include one or more sensors 210, one or more indicators 220, a timer 230, and a communication interface 240. The arrangement and number of components in tracking module 202 is provided for purposes of illustration. Additional arrangements, number of components, and other modifications may be made, consistent with the present disclosure.

In some embodiments, sensors 210 may include one or more software and/or hardware components for sensing events or aspects associated with a storage container. For example, sensors 210 may include a photodetector that is configured to detect and constantly measure the amount of light in proximity to a storage container. The photodetector may be implemented as any type of photodetectors known in the art. For example, sensor 210 may be an ambient light sensor that includes a photodiode. In this example, sensor 210 is used to measure light intensity or illuminance (in luminous flux per unit area, or lux) in proximity to a storage container.

As an example implementation of the above, a tracking module 202 that includes a photodetector type of sensor 210 may be located in a refrigeration unit. Sensor 210 may be used to detect changes in light intensity as a result of an event associated with the refrigeration unit. An event may include, for example, a door of the refrigeration unit being opened. As a result, the light intensity proximate to tracking module 202 may increase. Alternatively, or in addition, a light inside of the refrigeration unit may also be illuminated in association with the refrigerator unit's door being opened. Accordingly, sensor 210 may also detect an increase in light intensity as a result of the internal light being illuminated. As another example, an event may include the door of the refrigeration unit being closed and/or the internal light being deactivated. As such, the light intensity proximate to the tracking module 202 may decrease.

In some embodiments, sensors 210 may include one or more software and/or hardware components for sensing and/or detecting events or aspects associated with food or perishables. For example, sensors 210 may include a photodetector that is configured to collect, analyze, and store color histogram data. The photodetector may include, for example, an active-pixel sensor (APS), a charge-coupled device (CCD) sensor, a photodiode, or any other photodetector capable of collecting color histogram data. The photodetector may collect histogram data associated with food or perishables when they are initially stored in a storage container. For example, a user may place food or perishables in a storage container, associate tracking module 202 with the storage container, and activate tracking module 202. Upon activation, tracking module 202 may initially collect, analyze and store color histogram data associated with the food or perishables in a storage container. The photodetector may continue to collect, analyze, and store color data associated with the food or perishables in a storage container while tracking module 202 remains activated.

In some embodiments, analyzing color histogram data associated with food or perishables may include comparing the sensed color histogram data with control data. The control data may include color histograms associated with fresh, degraded, and/or spoiled food or perishables. For example, a user may store broccoli in a storage container. Tracking module 202 may be activated, and the photodetector may collect color histogram data associated with the broccoli. The photodetector may compare the collected color histogram data with color histogram data that represents fresh, degraded, and/or spoiled broccoli. Alternatively, tracking module 202 may transmit the data collected by the photodetector to tracking device 140, and tracking device 140 may compare the collected color histogram data with color histogram data that represents fresh, degraded, and/or spoiled broccoli. Accordingly, the photodetector and/or tracking device 140 are capable of visually monitoring and determining the spoilage status of food or perishables stored in storage containers.

In some embodiments, sensors 210 may include an oxygen sensor and a carbon dioxide sensor. The oxygen and carbon dioxide sensors may be configured to collect, analyze, and store oxygen and carbon dioxide data, respectively, associated with food or perishables in a storage container. For example, the oxygen sensor may be configured to sense the concentration of oxygen gas within the storage container. The carbon dioxide sensor may be configured to sense the concentration of carbon dioxide gas within the storage container. Moreover, the sensors may be configured to determine the spoilage status of the food or perishables in a storage container. For example, broccoli stored in a storage container may consume oxygen and emit carbon dioxide as the broccoli transitions from fresh to spoiled. Accordingly, the sensed oxygen and carbon dioxide concentrations can be monitored and compared with a predetermined threshold indicative of spoilage in order to detect when the broccoli has spoiled. Alternatively, tracking module 202 may transmit the data collected by the oxygen and carbon dioxide sensors to tracking device 140, and tracking device 140 may monitor and compare the concentrations with the predetermined threshold. The predetermined threshold may be specific to a certain type of food or perishable.

In some embodiments, various combinations of sensors 210 may be used to sense and/or detect events or aspects associated with food or perishables stored in a storage container. For example, a photodetector configured to sense and analyze color histogram data may be used in conjunction with oxygen and carbon dioxide sensors to increase the confidence interval of a determination of spoilage status of food or perishables in a storage container.

Timer 230 may be configured to count days, hours and/or minutes which correlate to an expected expiration date for the food contents stored within a storage container. Timer 230 can be manually set to a time duration specified by the user using timer set 232. For example, timer set 232 may be a push button that a user can press to set the time duration. The user may push timer set 232 multiple times, each press corresponding to a predetermined increase in time duration.

For example, each press of timer set 232 may correspond to a one minute increase in the specified time duration. Other incremental increases may be used, such as minutes, hours, or days. Once the timer 230 has begun to count down the specified time duration, timer set 232 can be pushed by the user to add additional time to the time duration, thereby increasing the amount of time remaining in the time duration.

Timer reset 234 may be configured to reset the specified time duration back to zero. Timer reset 234 may be implemented as its own push button, or may be implemented as the same push button as timer set 232. In some embodiments, the user may press timer reset 234 to reset the specified time duration back to zero. In some other embodiments, the user may press and hold timer reset 234 for a predetermined time duration to reset the specified time duration back to zero. For example, if the same push button is configured to implement both timer set 232 and timer reset 234, and pressing the push button has already been configured to increase the amount of time in the specified time duration, the user may press and hold timer reset 234 for three seconds (or any other time duration) to reset the specified time duration back to zero.

Indicators 220 may be configured to provide a visual indication to the user associated with the spoilage status of the food contents in a storage container. In some embodiments, indicators 220 may be one or more light emitting diodes (LEDs). Indicators 220 may be implemented as a single LED that flashes intermittently to indicate spoilage status of the food contents in a storage container. For example, an LED indicator 220 may be configured with three different frequencies of intermittent flashes that correlate to various stages of spoilage status (e.g., spoilage is far off, spoilage is imminent, and spoilage has most likely occurred). The various stages of spoilage status may correspond to various time portions of the time duration specified by timer 230. For example, the user may specify a 3-day time duration using timer set 232 of timer 230. Timer 230 may begin to count down the 3-day timer duration. LED indicator 220 may begin with a slow or low frequency intermittent flash, transition to a high frequency intermittent flash the day before the food contents is expected to spoil, and transition to a solid illuminance once the specified time duration has expired.

In some embodiments, indicators 220 may be implemented as a single multicolor LED assembly or multiple LEDs comprising multiple colors. For example, a multicolor LED indicator 220 may be a red/green/yellow LED that changes color to indicate spoilage status of the food contents in a storage container. Multicolor LED indicator 220 may be configured with three different colors that correlate to various stages of spoilage status (e.g., spoilage is far off, spoilage is imminent, and spoilage has most likely occurred). The various stages of spoilage status may correspond to various time portions of the time duration specified by timer 230. For example, the user may specify a 3-day time duration using timer set 232 of timer 230. Timer 230 may begin to count down the 3-day timer duration. Multicolor LED indicator 220 may begin by illuminating as a green color, transition to a yellow color the day before the food contents is expected to spoil, and transition to a red color once the specified time duration has expired.

In some embodiments, indicator 220 may provide a visual indication as the result of an event. For example, sensor 210 may be configured as a photodetector and may detect increases and decreases in light intensity proximate to a storage container. Indicator 220 may be configured to provide a visual indication when the light intensity detected by sensor 210 is greater than a predetermined threshold. Indicator 220 may also be configured to deactivate the visual indication when the light intensity detected by sensor 210 is less than a predetermined threshold. The threshold may be configures as an illuminance value (as measured in lux) associated with a refrigeration unit door being opened or a light internal to the refrigeration unit being illuminated.

Communication interface 240 may be configured to send and receive data and/or instructions from tracking device 140. Communication interface 240 may be implemented as a Wi-Fi interface and may communicate with tracking device 140 through network 130. Alternatively, or in addition to, communication interface 240 may be implemented as a Bluetooth, NFC, or Wi-Fi Direct interface and may communicate with tracking device 140 via peer-to-peer connection 160.

Figure 3A:
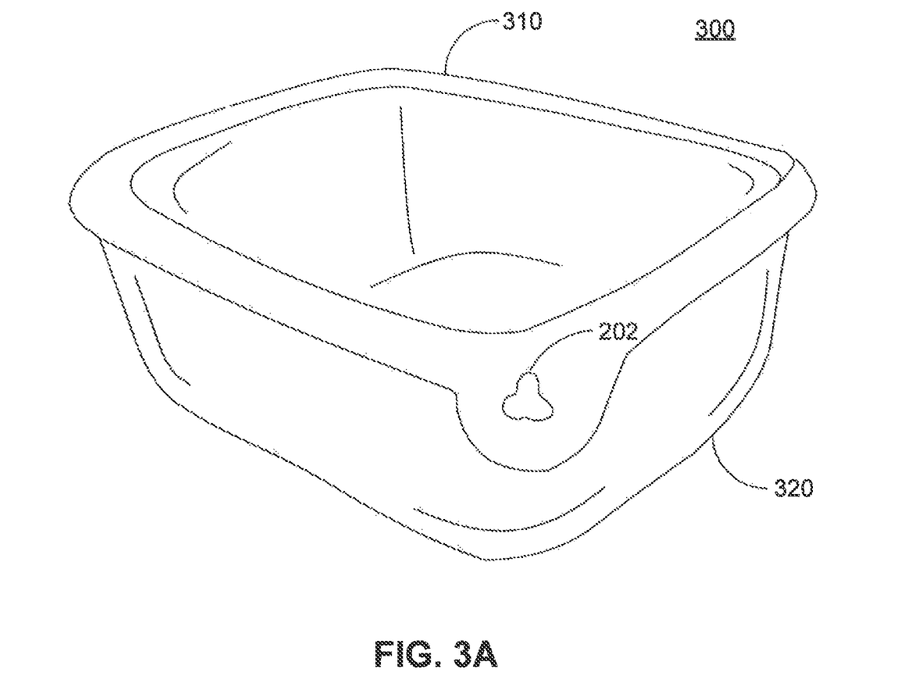
FIGS. 3A-3C illustrate an example implementation of devices configured according to some embodiments and aspects of the present disclosure.
Figure 3B:
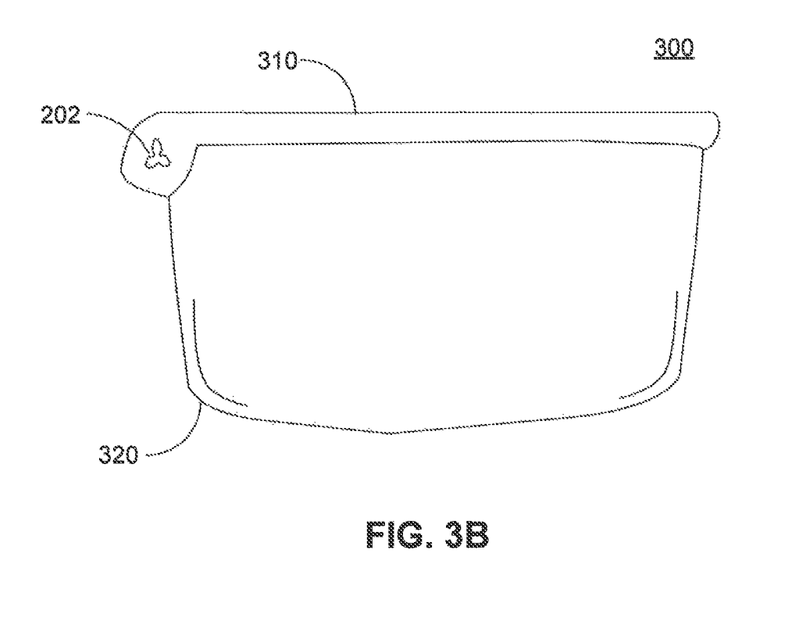
Figure 3C:
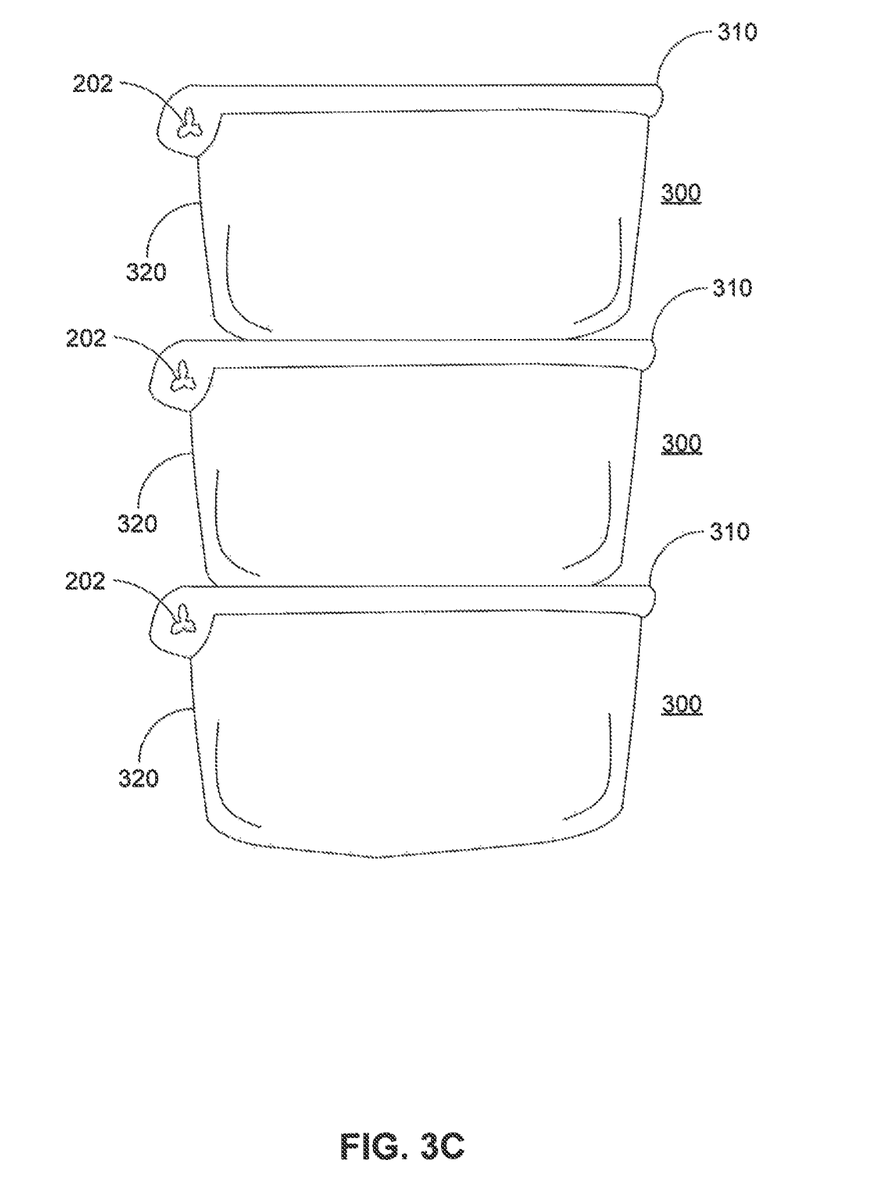

FIGS. 3A-3C illustrate an example implementation of storage container 300. By way of example, storage container 300 may be used to implement the storage containers of FIG. 1. FIGS. 3A and 3B illustrate a perspective view and a side plan view, respectively, of storage container 300 including a tracking module 202. As shown in FIGS. 3A and 3B, storage container 300 may include a lid 310 and a body 320. In some embodiments, lid 310 may be disconnectably connected to body 320. In some other embodiments, lid 310 may be fixed to body 320, for example, along an edge or an end of lid 310 and body 320.

In some embodiments, tracking module 202 may be located on lid 310. For example, tracking module 202 may be included in a protrusion that is located at one of the corners along the perimeter of lid 310. The protrusion may be hermetically sealed to prevent water or humidity ingress and, thus, damage to tracking module 202. In some other embodiments, tracking module 202 may be located at another location along the perimeter of lid 310. In still some other embodiments, tracking module 202 may be located on body 320. Locating tracking module 202 in a protrusion that is located at one of the corners along the perimeter of lid 310 or locating tracking module 202 at another location along the perimeter of lid 310 allows the user an unobstructed view of the food contents in storage container 300. For example, lid 310 may be clear (i.e., transparent or see-through) such that the food contents in storage container 300 can be viewed by the user through lid 310. Locating tracking module 202 at the perimeter of lid 310 prevents tracking module 202 from obstructing the user's view of food contents in storage container 300 through clear lid 310. Further, locating tracking module 202 in a protrusion that is located at one of the corners along the perimeter of lid 310 or locating tracking module 202 at another location along the perimeter of lid 310 allows the user an unobstructed view of the food contents through body 320. For example, in some embodiments body 320 may be clear (i.e., transparent or see-through) such that the food contents in storage container 300 can be viewed by the user through body 320. Locating tracking module 202 at the perimeter of lid 310 prevents tracking module 202 from obstructing the user's view of food contents in storage container 300 through clear body 320.

FIG. 3C illustrates a side plan view of a plurality of storage containers 300. As shown in FIG. 3C, the storage containers 300 may be stackable. For example, each lid 310 and may be configured so a body 320 may rest on top of it. Accordingly, each body 300 may also be configured so that it may rest on top of a lid 310. Locating tracking module 202 in a protrusion that is located at one of the corners along the perimeter of lid 310 or locating tracking module 202 at another location along the perimeter of lid 310 allows for the ability to stack storage containers 300 without obstructing the user's view of tracking module 202. Further, such placement of tracking module 202 allows the user an unobstructed view of the food contents through body 320.

Figure 4:
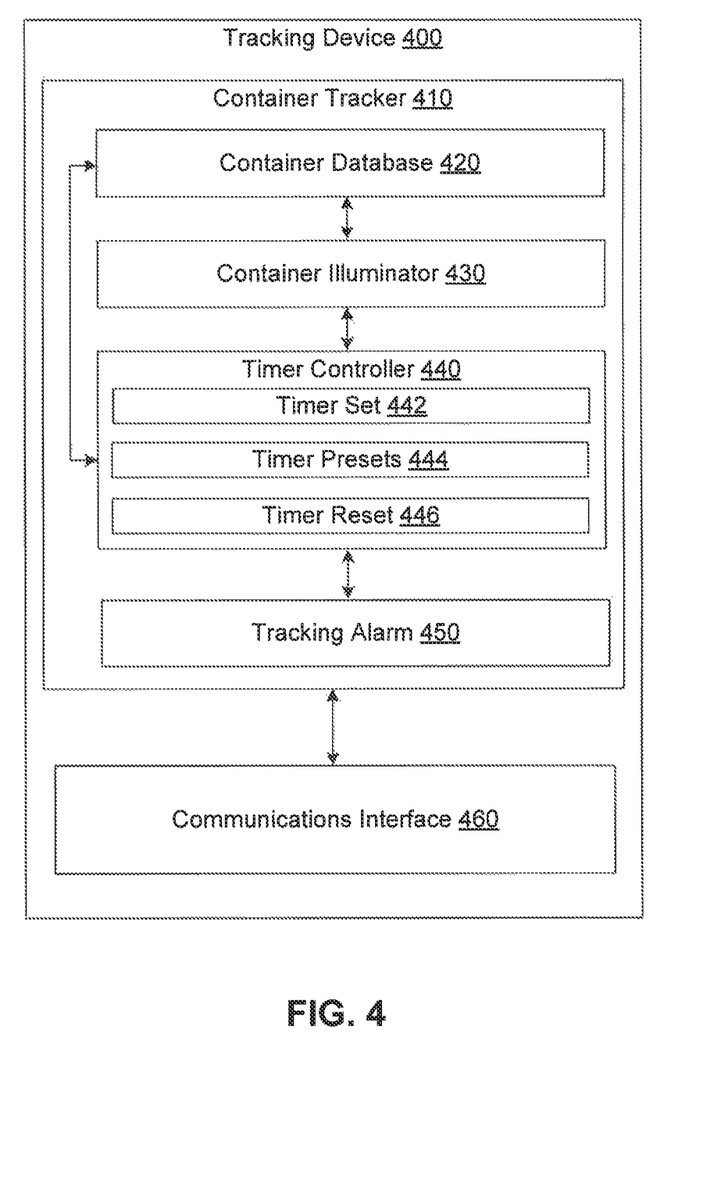
FIG. 4 illustrates an example tracking device or system for implementing some embodiments and aspects of the present disclosure.

FIG. 4 illustrates an example tracking device 400 according to some embodiments and aspects of the present disclosure. In some embodiments, tracking device 400 may be configured for managing information associated with food storage containers. By way of example, tracking device 400 may be used to implement tracking device 140 of FIG. 1. Tracking device 400 may include a container tracker 410 and a communications interface 460. The arrangement and number of components in tracking device 400 is provided for purposes of illustration. Additional arrangements, number of components, and other modifications may be made, consistent with the present disclosure.

Communication interface 460 may be configured to send and receive data and/or instructions from tracking modules 110 and 120. Communication interface 460 may be implemented as a Wi-Fi interface and may communicate with tracking modules 110 and 120 through network 130. Alternatively, or in addition to, communication interface 460 may be implemented as a Bluetooth, NFC, or Wi-Fi Direct interface and may communicate with tracking modules 110 and 120 via peer-to-peer connection 160.

Container tracker 410 may include a container database 420, a container illuminator 430, a timer controller 440, and a tracking alarm 450. In some embodiments, container database 420, container illuminator 430, timer controller 440, and tracking alarm 450 may be implemented as hardware modules configured to execute the functions described herein. In some other embodiments, a container tracking processor (not shown) may be configured to execute the functions of container database 420, container illuminator 430, timer controller 440, and tracking alarm 450. For example, container tracking processor may communicate with a memory/storage device (not shown) that includes container database 420, container illuminator 430, timer controller 440, and tracking alarm 450 in the form of computer-executable instructions, such that container tracking processor may then execute these instructions. As another example, the functions of container database 420, container illuminator 430, timer controller 440, and tracking alarm 450 may be included in container tracking processor, such that container tracking processor is configured to implement these functions.

In some embodiments, container database 420 may include information associated with one or more storage containers associated with tracking modules 110, 120 that are being tracked by a user. For example container database 420 may include one or more identifiers associated with storage containers that include a timer 230 that has been enabled to track a timer duration specified by the user. Container database 420 may also list the contents of each storage container. For example, the contents may be represented by a visual indicator (e.g., an image of a chicken may be used if the container contains chicken), a descriptor (e.g., the word "Chicken" may be used if the container contains chicken), or any combination thereof. Further, container database 420 may also include for each storage container the time remaining before the time duration associated with that container expires. For example, the time remaining may be represented as a number of days remaining (e.g., 3 Days Remaining), a number of hours and minutes remaining (e.g., 48 Hours 23 Minutes Remaining), or any combination thereof (e.g., 3 Days 2 Hours 14 Minutes Remaining).

In some embodiments, container database 420 may include a qualitative indicator that corresponds to various stages of spoilage status (e.g., spoilage is far off, spoilage is imminent, and spoilage has most likely occurred). The various stages of spoilage status may correspond to various time portions of the time duration specified by a timer 230 of a tracking module 110 or 120. For example, the user may specify a 3-day time duration wherein the qualitative indicator begins as "Fresh", thereby indicating a low likelihood of spoilage. As the time duration reaches expiration, qualitative indicator may transition to "Nearing Spoilage" the day before the food contents are expected to spoil. The qualitative indicator may transition to "Spoiled" once the specified time duration has expired.

In some embodiments, timer controller 440 may be used to implement some or all of the functions of timer 230. For example, timer controller 440 may be configured to count days, hours and/or minutes which correlate to an expected expiration date for the food contents stored within a storage container. In some other embodiments, timer controller 440 may be used to set and reset the time period tracked by timer 230. In some embodiments, timer controller 440 can be implemented to manually set to a time duration specified by the user using timer set 442. For example, timer set 442 may be a push button or a graphical representation on a touch screen that a user can press to set the time duration. The user may push timer set 442 multiple times, each press corresponding to a predetermined increase in time duration. For example, each press of timer set 442 may correspond to a one minute increase in the specified time duration. Other incremental increases may be used, such as minutes, hours, or days. In some embodiments, timer set 442 may allow a user to enter the desired amount of time using an input such as a physical or touchscreen keyboard. Once the desired time period has been selected by the user, communications interface 460 may transmit instructions to timer 230 of tracking module 110 or 120 to begin tracking the time period. Timer 230 may begin to count down the specified time duration. Timer set 442 can be pushed by the user to add additional time to the time duration, thereby increasing the amount of time remaining in the time duration.

In some embodiments, timer controller 440 may be used to set timer 230 to a specified time duration using timer presets 444. Timer presets 444 may include one or more predetermined time durations associated with various types of food contents. For example, may include predetermined time durations associated with chicken, broccoli, eggs, etc. The predetermined time durations associated with a specific type of food may depend on whether the food is raw or has been cooked. For example, a predetermined time duration associated with raw chicken may be different from a predetermined time duration associated with cooked chicken.

Timer reset 446 may be configured to reset the specified time duration back to zero. Timer reset 446 may be implemented as its own push button (physical or touchscreen based), or may be implemented as the same push button as timer set 442. In some embodiments, the user may press timer reset 446 to reset the specified time duration back to zero. In some other embodiments, the user may press and hold timer reset 446 for a predetermined time duration to reset the specified time duration back to zero. For example, if the same push button is configured to implement both timer set 442 and timer reset 446, and pressing the push button has already been configured to increase the amount of time in the specified time duration, the user may press and hold timer reset 446 for three seconds (or any other time duration) to reset the specified time duration back to zero.

Tracking alarm 450 may be configured to provide an indication to the user of various stages of food spoilage. For example tracking alarm 450 may be configured to provide the user with an indication that the time duration tracked by timer controller 440 (or timer 230) is about to expire. As an example, tracking alarm 450 may provide the user with an indication that there may be one day remaining in the time duration. The indication may be implemented as a visual cue (e.g., a popup alert or reminder on a display screen of tracking device 400 (not shown)), an audio cue (e.g., a tone or sequence of tones played by tracking device 400), or any combination thereof (e.g., a popup alert in combination with a sequence of tones). The indication, therefore, may alert the user that the contents stored in a storage container is about to spoil and should be consumed immediately. Tracking alarm 450 may also be configured to provide the user with an indication that the time duration has expired. The indication that the time duration has expired may be different from the indication that one day is remaining in the time duration (e.g., different visual/audio cues may be used). The indication, therefore, may alert the user that the contents stored in a storage container has spoiled and should be discarded by the user.

Container illuminator 430 may enable the user to select specific storage containers associated with one or more tracking modules 110, 120, and activate/deactivate their indicators. For example, a user may select a storage container from container database 420. The user may select container illuminator 430, and container illuminator 430 may send instructions to the tracking module 110 associated with the selected storage container through communications interface 460 to active an indicator 220 associated with the selected storage container. If indicator 220 is configured with a multicolor LED indicator, for example, the user may illuminate the multicolor LED indicator 220 by selecting container illuminator 430. The user may select container illuminator 430 again to deactivate multicolor LED indicator 220. Thus, container illuminator 430 allows a user to quickly identify storage container and their contents, as well as the spoilage status of those contents.

Certain features which, for clarity, are described in this specification in the context of separate embodiments may also be provided in combination as a single embodiment. Conversely, various features which, for brevity, are described in the context of a single embodiment may also be provided in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

What is claimed is:

1. A device for tracking spoilage status of a perishable food item, the device comprising:
   a food storage container comprising a lid and a body;
   a wireless tracking module contained with the food storage container and comprising a communications interface configured to receive instructions and configured to send instructions to track spoilage status of a perishable stored in the storage container;
   wherein the received instructions comprise the steps of: set timer, turn on visual display indicator based on ambient light reading, turn off visual display indictor based on ambient light reading, change timer setting, stop timer, activate tracking module, associate tracking module with the food storage container, receive information associated with the contents of the food storage container, and reset device; and
   wherein the sent instructions comprise the steps of: button press notification, ambient light reading, food is no longer being tracked, and device has been turned off;
   a timer configured to count the time remaining before a spoilage event;
   a visual display indicator configured to provide a visual indication of food spoilage status as determined by a comparison of counted time on the timer to a food spoilage time for a specified food; and
   a photodetector operatively coupled to the visual display indicator and configured to deactivate the visual display indicator when light intensity detected by the photodetector is less than a predetermined threshold.

2. The device of claim 1, wherein the wireless tracking module is contained in the lid of the food storage container.

3. The device of claim 2, wherein the wireless tracking module is located in a protrusion at a corner along a perimeter of the lid.

4. The device of claim 1, wherein the visual display indicator is activated to provide an indication of food spoilage status in response to light intensity proximate to the food storage container being greater than a predetermined light intensity threshold.

5. A device for tracking spoilage status of a perishable food item, the device comprising:
   a food storage container comprising a lid;
   a wireless tracking module contained with the food storage container and comprising a communications interface configured to receive instructions and configured to send instructions to track spoilage status of a perishable stored in the storage container;
   wherein the received instructions comprise the steps of: set timer, turn on visual display indicator based on ambient light reading, turn off visual display indictor based on ambient light reading, change timer setting, stop timer, activate tracking module, associate tracking module with the food storage container, receive information associated with the contents of the food storage container, and reset device; and
   wherein the sent instructions comprise the steps of: button press notification, ambient light reading, food is no longer being tracked, and device has been turned off;
   a timer configured to count the time remaining before a spoilage event;
   a visual display indicator configured to provide a visual indication of food spoilage status as determined by a comparison of counted time on the timer to a food spoilage time for a specified food; and
   a photodetector operatively coupled to the visual display indicator and configured to deactivate the visual display indicator when light intensity detected by the photodetector is less than a predetermined threshold.

6. The device of claim 5, wherein the timer is configured to count multiple time portions wherein each time portion corresponds to a different spoilage status.

7. The device of claim 6, wherein the visual display indicator comprises a light emitting diode configured to flash at different frequencies for each time portion to provide an indication of spoilage status corresponding to the respective time portion.

8. The device of claim 6, wherein the visual display indicator comprises a multicolor light emitting diode configured to emit different colors for each time portion to provide an indication of spoilage status corresponding to the respective time portion.

9. The device of claim 6, wherein the visual display indicator includes an array of light emitting diodes of different colors, wherein each light emitting diode in the array is configured to illuminate for a different time portion to provide an indication of spoilage status corresponding to the respective time portion.

10. The device of claim 5, wherein the communications interface is configured to receive instructions to provide an indication of spoilage status of a perishable food item contained in the food storage container.

11. The device of claim 5, wherein the communications interface is configured to receive instructions to track spoilage status of perishables stored in a plurality of storage containers.

12. A device for tracking spoilage status of a perishable food item, the device comprising:
 a food storage container comprising a lid and a body;
 a wireless tracking module contained with the food storage container and comprising a communications interface configured to receive instructions and configured to send instructions to track spoilage status of a perishable stored in the storage container;
 wherein the received instructions comprise the steps of: set timer, turn on visual display indicator based on ambient light reading, turn off visual display indictor based on ambient light reading, change timer setting, stop timer, activate tracking module, associate tracking module with the food storage container, receive information associated with the contents of the food storage container, and reset device; and
 wherein the sent instructions comprise the steps of: button press notification, ambient light reading, food is no longer being tracked, and device has been turned off;
 a timer configured to count the time remaining before a spoilage event;
 an alarm operatively coupled to the timer and configured to provide an indication of spoilage status of a perishable food item contained in the food storage container;
 a visual display indicator configured to provide a visual indication of food spoilage status as determined by a comparison of counted time on the timer to a food spoilage time for a specified food; and
 a photodetector operatively coupled to the visual display indicator and configured to deactivate the visual display indicator when light intensity detected by the photodetector is less than a predetermined threshold.

13. The device of claim 12, wherein the alarm is an audible alarm.

14. The device of claim 12, wherein the alarm is a visual alarm.

15. The device of claim 12, wherein the timer is configured to count multiple time portions wherein each time portion corresponds to a different spoilage status.

16. The device of claim 15, wherein the visual display indicator comprises a light emitting diode configured to flash at different frequencies for each time portion to provide an indication of spoilage status corresponding to the respective time portion.

17. The device of claim 12, further comprising a container illuminator.

18. The device of claim 12, further comprising a computer having a processor, memory and access to computer readable media, the computer configured to access a database of food spoilage times.

* * * * *